Nov. 1, 1949.  J. L. KING, JR  2,486,603
ONE-WAY SPRAG TYPE CLUTCH
Filed Dec. 23, 1946  2 Sheets-Sheet 1
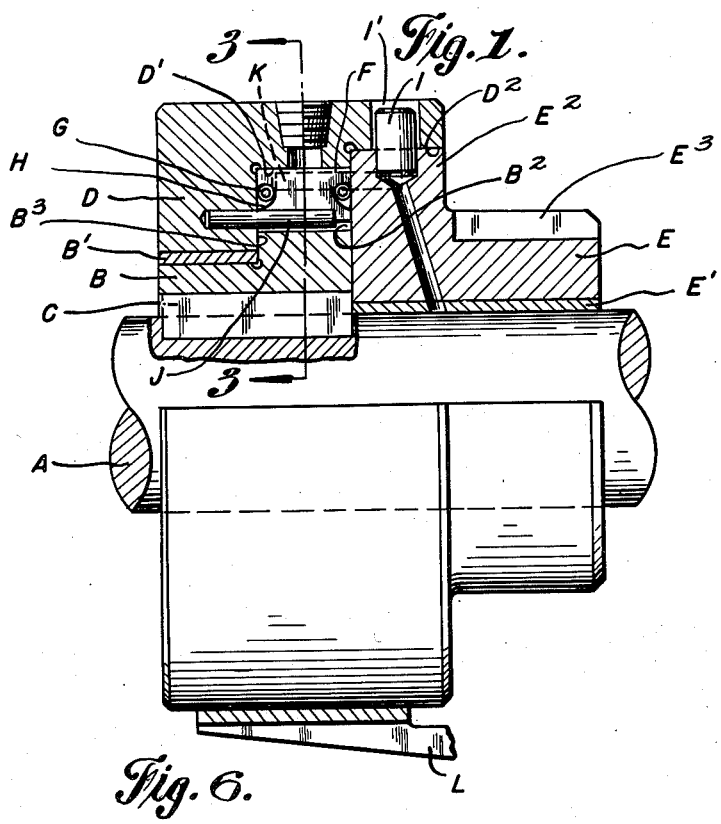
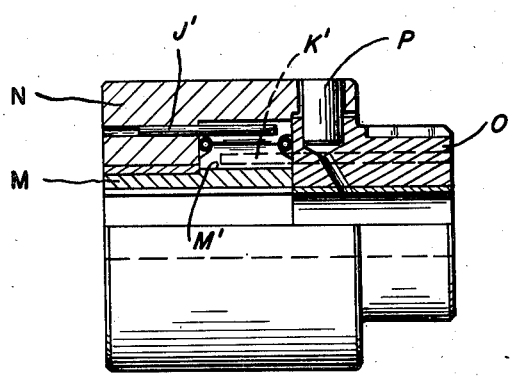
INVENTOR.
JOHN L. KING JR.
BY
Whittemore, Hulbert & Belknap
ATTORNEYS.

Nov. 1, 1949.  J. L. KING, JR  2,486,603
ONE-WAY SPRAG TYPE CLUTCH
Filed Dec. 23, 1946  2 Sheets-Sheet 2
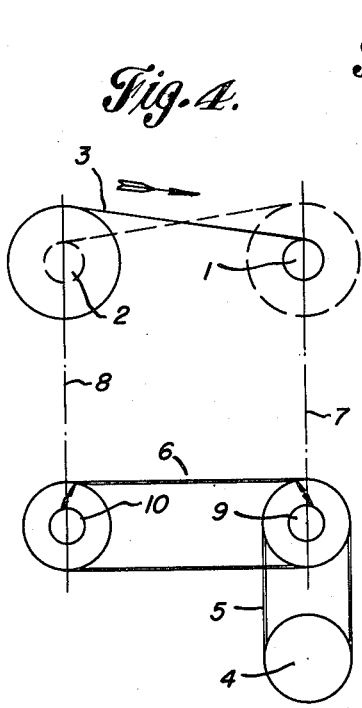
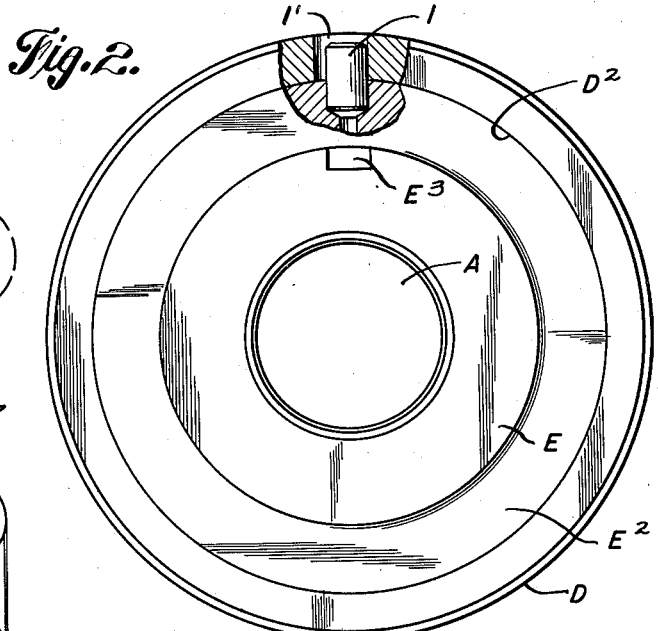
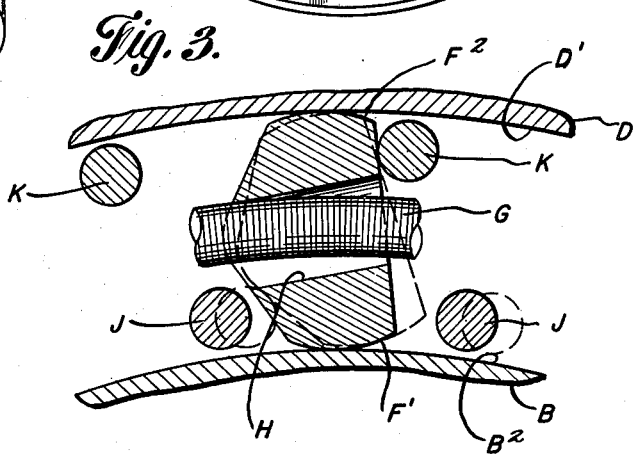
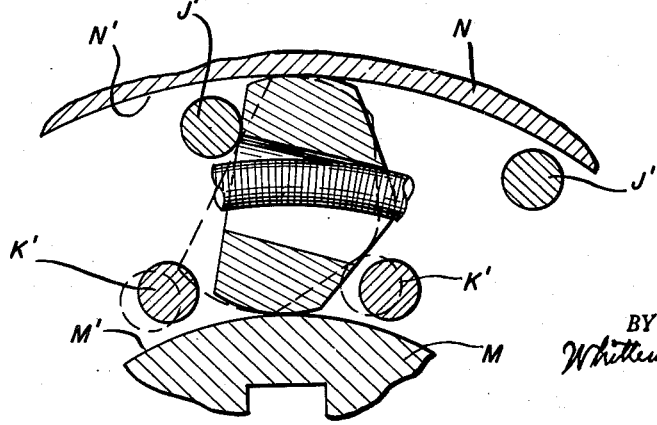
INVENTOR.
JOHN L. KING JR.
BY Whittemore Hulbert & Belknap
ATTORNEYS.

Patented Nov. 1, 1949

2,486,603

UNITED STATES PATENT OFFICE 2,486,603

ONE-WAY SPRAG TYPE CLUTCH

John L. King, Jr., Royal Oak, Mich., assignor to The Gear Grinding Machine Company, Hamtramck, Mich., a corporation of Michigan Application December 23, 1946, Serial No. 717,857

5 Claims. (Cl. 192—45.1)

The invention relates to one-way rotary clutches of that type in which torque is transmitted from one member to another through a series of sprags arranged between concentric raceways on the respective members. With such construction one of said members may be used as a driver in one direction of rotation and the other member as a driver in the reverse direction of rotation. In each case the driven member is free to overrun or revolve at a velocity in excess of that of the driving member. This occurs either where the driven member is accelerated by some additional force, or where the velocity of the driving member is reduced.

For certain uses, it is desirable to have a one-way clutch which will operate only in one direction of rotation and will never engage when the direction of rotation is reversed. It is, therefore, the primary object of the instant invention to obtain a clutch of this character. To this end the invention consists in a construction in which the torque transmitting means operative in one direction of rotation is automatically rendered inoperative when the direction of rotation is reversed. The invention further consists in the construction as hereinafter set forth.

In the drawings:

Fig. 1 is a side elevation partly in longitudinal section of my improved one-way, rotary clutch;

Fig. 2 is an end elevation looking from the right of Fig. 1;

Fig. 3 is an enlarged section on line 3—3, Fig. 1;

Fig. 4 is a diagram illustrating one of the uses of my improved clutch;

Fig. 5 is a view similar to Fig. 3 showing a modified construction; and

Fig. 6 is a view similar to Fig. 1 of said modified construction.

For a better understanding of the utility of my improved clutch construction Fig. 4 illustrates diagrammatically an apparatus in which it is employed. In this 1 and 2 are reels mounted in spaced relation to each other and 3 is a fabric wound upon said reels and alternately transferred from one to the other. During such travel the fabric intermediate the reels is processed, but this is not illustrated in the diagram. The reels are driven by a reversible motor 4 which is connected by belts or chains 5 and 6 with the shafts 7 and 8 respectively connected to the reels 1 and 2. There are also one-way rotary clutches 9 and 10 of my improved construction intermediate the driving chains and the shafts 7 and 8. The former operates to drive its shaft only in a clockwise direction and the latter to drive its shaft in a counter- clockwise direction. Thus in operation the motor 4 when rotating in one direction will drive only reel 1, the reel 2 being driven through the fabric 3 and the clutch 10 permitting it to run freely. On the other hand, when the motor revolves in the reverse direction the reel 2 will be positively driven thereby the fabric 3 driving the reel 1 and the clutch 9 permitting said reel to revolve freely. In both directions of rotation the reels directly driven by the motor will revolve at the same angular speed, but the reels when driven through the fabric will rotate at varying velocities. Assuming that all of the fabric is upon the reel 2 (as illustrated in full lines) and that the reel 1 is then driven by the motor the angular velocity of the reel 2 will be less than that of the reel 1 on account of the increased diameter of the former by the fabric wound thereon. During the continued operation the fabric diameter on the reel 2 will progressively decrease and that on the reel 1 will increase so that the angular velocity of the reel 2 will be progressively increased until it exceeds that of the reel 1. It will therefore be apparent that the clutches 9 and 10 if these were of the type permitting engagement in both directions of rotation would interfere with successful operation for as soon as the angular velocity of the fabric driven reel equals or exceeds that of the motor driven reel its clutch would engage and thus couple it to the motor. However, as the angular velocity transmitted to the reels from the motor is the same this would act as a brake on the fabric driven reel resuling in the rupturing of the fabric at some point between the reels. With my improved clutch construction this cannot occur as the driven member will be free from the driving member at all speeds and relative speeds when rotating in the reverse direction.

Clutch construction

As illustrated in Figs. 1 to 4, inclusive, A is a shaft member on which is rotatably fastened a member B by suitable means such as a key C. D is a member rotatably mounted on a bearing portion B' of the member B which is adjacent to a cylindrical race portion B² thereon this being of somewhat larger diameter and separated from the portion B' by a shoulder B³. D' is a cylindrical race member on a portion of the inner surface of the member D which surrounds and is spaced from the race member B². E is a member revolubly supported on the shaft A and having a bearing portion E' engaging the same. A portion E² of the member E extends radially outward adjacent to the member B overlapping a portion of the member D and having its peripheral portion adjacent to a portion D² of the member D. The member E is provided with a gear portion E³ adapted for connection with a suitable driving train. Between the concentric races B² and D' is arranged a series of sprags F. These may be of any suitable construction, but as shown have arcuate inner and outer surfaces F', F², which are eccentric to each other so that the rocking of the sprag in one direction will wedge it between said races. The sprags are energized to rock into engagement with the races preferably by garter springs G which are arranged in annular slots H at opposite ends of the sprags. These slots are so inclined with respect to the circle of the garter springs that the latter bear against each sprag at one side of its center. As specifically illustrated the garter springs G exert an outward pressure and tend to rock the sprags in a clockwise direction as viewed in Fig. 3. Thus, with the construction as thus far described, the sprags will be held in frictional contact with both races by the pressure of said garter springs. The members D and E are connected to each other by one or more coupling pins I which extend radially between portions E² and D², but are provided with a limited lost motion in one of these members for a purpose to be hereinafter described. Assuming that the member E is the driver and that the direction of rotation as viewed in Fig. 3, is clockwise, torque will be transmitted from the member D to the member B which will drive the shaft A. However, this shaft and member B will be free at any time to overrun or rotate at higher velocity than the members D and E.

To render the torque transmitting means inoperative when the direction of rotation is reversed or counterclockwise as viewed in Fig. 3, I have devised the following construction. J are pins secured to the member D and projecting into the space between the races B² and D' adjacent to the former and to each of the sprags F. K are similar pins engaging the member E and projecting into the space between the races on the opposite side of each sprag adjacent to the race D'. In the normal position of parts the pins J and K for each sprag are sufficiently spaced to permit freedom of movement of said sprag into contact with both races. If, however, the member E is slightly rotated with respect to the member D the pins J and K will be moved towards each other to rock the sprag F therebetween and in cooperation with the garter spring G the arcuate surface F' will be withdrawn from contact with the race B². Such relative rotation of the members E and D is permitted by the lost motion connection before referred to, this being specifically a circumferentially extending slot I' in the portion D² into which the pin I extends. When the member E is rotating in a clockwise direction as viewed in Figs. 2 and 3, the pin I will bear against the right-hand end of the slot I', the pins K will be in contact with the sprags F and the pins J out of contact with said sprags. If the direction of rotation of the member E is reversed, or counterclockwise as in Figs. 2 and 3, the pin I will travel to the left-hand end of the slot I' the member D remaining stationary. This will also move the pins K counterclockwise carrying with them the sprags F until the latter contact with the pins J which remain stationary with the member D. This will cause the tilting of the sprags F in a counterclockwise direction which, in cooperation with the garter springs G, will remove the inner arcuate surface F' of each sprag from contact with the inner race member B². Thus the torque transmitting means will remain inoperative at all times during the reverse or counterclockwise rotation and without regard to the velocity or relative velocities of the members E and A. In what has just been said it has been assumed that the member D either remains stationary or revolves at a velocity which is less than that of the member E. However, there will be a certain amount of frictional drag by the member E upon the member D and also the reaction of the garter springs in connection with the sprags and race members will tend to move the member D with the member E. Such action is prevented by the provision of suitable means for resisting movement of the member D such for instance as a shoe L in frictional contact with the peripheral surface member D. The resistance need not be very great and will not prevent rotation of said member D if driven by some other source of power.

Considering the clutch as above described in connection with mechanism diagrammatically represented in Fig. 4, it will be understood that neither of the clutches 9 or 10 will engage during rotation of the members thereof which is reversed from the intended direction of engagement. For instance, if the fabric 3 is traveling in the direction indicated by the arrow the angular velocity of the reel 2, which at the start is less than that of the reel 1, will later become greater than that of the latter reel which with the ordinary type of one-way clutch would cause the clutch 10 to engage. This, however, will not occur with my improved clutch and the reel 2 remains free of its motor driving mechanism during the entire unreeling operation of the fabric.

The modified construction illustrated in Figs. 5 and 6 differs from the construction shown in Fig. 1 chiefly in that the lost motion connection is between the intermediate member and the driven member, whereas in the other construction it is between the driving member and the intermediate member. Thus as specifically illustrated in Figs. 5 and 6, the inner member M is the driving member having a race portion M'. N is the intermediate member having the concentric race portion N' and O is the driven member which is connected to the member N by the lost motion connection P. Sprags are arranged between the races M' and N' so that rotation of the member M clockwise will communicate torque to the member N. There are also pins J' and K', respectively, attached to the members N and O to extend beyond opposite sides of each sprag. The pin J' being adjacent to the outer race N' while the pin K is adjacent to the inner race M'. The arrangement is such that the members N and O are free to rotate clockwise at a velocity in excess of that of the member M. If, however, the member O should be rotated counterclockwise this would take up the lost motion between the same and the member N thereby moving the pin K' so as to withdraw the sprag from contact with the inner race M'. Thus, the member O cannot act as a driver for the member M in either direction of rotation.

What I claim as my invention is:

1. In a one-way rotary clutch including a pair of co-axial rotary members and an intermediate rotary member, spaced concentric raceways respectively on one of the members of said pair and said intermediate member, a sprag between said raceways for transmitting torque between the same in one direction of rotation, a limited lost motion connection between said intermediate member and the other member of said pair, and means automatically operating upon rotation of the last-mentioned of said pair of members in a reverse direction for withdrawing said sprag from contact with one of said race members and maintaining it withdrawn at all speeds and differential speeds of rotation of said members in the said reverse direction.

2. A one-way rotary clutch comprising a pair of rotary members and an intermediate rotary member, spaced concentric raceways respectively on one member of said pair and said intermediate member, a limited lost motion connection between said intermediate member and the other member of said pair, a sprag for transmitting torque between said raceways in one direction of rotation, means operated by a relative movement of said intermediate member and the member to which it has lost motion connection for withdrawing said sprag from engagement with one of said race members whereby a rotation of the last-mentioned of said pair of members in reverse direction will disengage said clutch and maintain it disengaged at all speeds of rotation of said members in the said reverse direction.

3. A one-way rotary clutch comprising a pair of co-axial rotary members and an intermediate rotary member, spaced concentric raceways respectively on one of the members of said pair and said intermediate member, a sprag between said raceways for transmitting torque between the same in one direction of rotation, a limited lost motion connection between said intermediate member and the other member of said pair, stops respectively attached to the latter member and to said intermediate member arranged upon opposite sides of said sprag and normally providing sufficient clearance therebetween for movement of said sprag into clutching engagement with said race members, and means for slightly resisting rotation of said intermediate member whereby rotation of the last-mentioned of said pair of members in the reverse direction will cause a relative movement of said stops to engage said sprag and to withdraw it from contact with one of said race members.

4. A one-way rotary clutch comprising a pair of rotary members and an intermediate rotary member, spaced concentric raceways respectively on one member of said pair and said intermediate member, a sprag between said raceways for transmitting torque therebetween in one direction of rotation, a limited lost motion connection between said intermediate member and the other member of said pair, stops respectively on the latter member and said intermediate member arranged on opposite sides of said sprag and in the normal position of said lost motion connection providing sufficient freedom for said sprag to engage said race member, energizing means for yieldably urging said sprag into engagement with said race members and friction means for slightly resisting rotation of said intermediate member whereby rotation of the last mentioned of said pair of members in the reverse direction will relatively move said stops to withdraw said sprag from engagement with one of said race members.

5. A one-way rotary clutch comprising a pair of rotary members and an intermediate rotary member, spaced concentric raceways respectively on one member of said pair and said intermediate member, a sprag between said raceways for transmitting torque therebetween, energizing means for yieldably urging said sprag into engagement with said raceways, a limited lost motion connection between said intermediate member and the other member of said pair, pins extending respectively from the latter member and from said intermediate member on opposite sides of said sprag and in one position of said lost motion connection providing sufficient freedom to said sprag for engagement with said raceways, said pins in the opposite position of said lost motion connection contacting with said sprag and withdrawing the same from contact with one of said race members against the urging of said energizing means, and friction means for slightly resisting rotation of said intermediate member whereby rotation of the last-mentioned of said pair of members in the reverse direction will relatively move said pins to disengage said sprag from one of said race members.

JOHN L. KING, Jr.

REFERENCES CITED

The following references are of record in the file of this patent:

UNITED STATES PATENTS

| Number | Name | Date |
|---|---|---|
| 764,311 | Spangenberg | July 5, 1904 |
| 1,472,479 | Lindgren | Oct. 30, 1923 |
| 2,247,713 | Peterson et al. | July 1, 1941 |
| 2,366,842 | Dodge et al. | Jan. 9, 1945 |
| 2,366,843 | Dodge et al. | Jan. 9, 1945 |
| 2,386,013 | Swensen | Oct. 2, 1945 |
| 2,399,749 | Lund | May 7, 1946 |
| 2,428,968 | Gruenberg | Oct. 14, 1947 |